(12) United States Patent
Hayashi

(10) Patent No.: US 8,029,015 B2
(45) Date of Patent: Oct. 4, 2011

(54) AIRBAG COVER AND AIRBAG APPARATUS

(75) Inventor: Shinji Hayashi, Minato-ku (JP)

(73) Assignee: Takata Corporation, Tokyo (JP)

( * ) Notice: Subject to any disclaimer, the term of this patent is extended or adjusted under 35 U.S.C. 154(b) by 2 days.

(21) Appl. No.: 12/490,943

(22) Filed: Jun. 24, 2009

(65) Prior Publication Data

US 2010/0001494 A1 Jan. 7, 2010

(30) Foreign Application Priority Data

Jul. 3, 2008 (JP) .................................. 2008-175108

(51) Int. Cl.
*B60R 21/215* (2006.01)

(52) U.S. Cl. .................... 280/728.3; 280/728.2; 280/732

(58) Field of Classification Search ............... 280/728.3, 280/732, 728.2
See application file for complete search history.

(56) References Cited

U.S. PATENT DOCUMENTS

| | | | | |
|---|---|---|---|---|
| 5,779,262 | A * | 7/1998 | Totani et al. | 280/728.3 |
| 5,868,419 | A * | 2/1999 | Taguchi et al. | 280/728.3 |
| 6,109,645 | A * | 8/2000 | Totani et al. | 280/728.3 |
| 6,168,188 | B1 * | 1/2001 | Preisler et al. | 280/728.3 |
| 6,398,256 | B1 * | 6/2002 | Saito | 280/732 |
| 6,742,803 | B2 * | 6/2004 | Ueno et al. | 280/728.3 |
| 2006/0028003 | A1 * | 2/2006 | Soejima | 280/732 |
| 2007/0205585 | A1 * | 9/2007 | Okada et al. | 280/728.3 |

FOREIGN PATENT DOCUMENTS

| | | |
|---|---|---|
| EP | 1 193 140 A2 | 4/2002 |
| EP | 1 623 814 A2 | 2/2006 |
| GB | 2 439 011 A | 12/2007 |
| JP | H02-171364 A | 7/1990 |
| JP | H09-150696 A | 6/1997 |
| JP | H10-236260 A | 9/1998 |
| JP | 2003-137057 A | 5/2003 |

(Continued)

OTHER PUBLICATIONS

Hiroyuki Sugawara, Cover Body of Airbag Device, Nov. 8, 2007, JPO, JP 2007-290409 A, English Abstract.*

(Continued)

*Primary Examiner* — Ruth Ilan
*Assistant Examiner* — James English
(74) *Attorney, Agent, or Firm* — Fitch Even Tabin & Flannery

(57) ABSTRACT

An airbag cover and an airbag apparatus are provided which achieve cost reduction by integrally molding an instrument panel and an inner case as well as ensure the rigidity of the instrument panel without degrading the aesthetically pleasing of the instrument panel. An airbag cover according to one form of the present invention is an airbag cover that is formed by integrally molding a plate-like portion constituting a vehicle interior surface and an inner case that is disposed on the back face of the plate-like portion and constitutes an airbag inflation and deployment path, wherein the plate-like portion constitutes part of the instrument panel disposed in front of an occupant, and the inner case is formed in a position in front of an occupant in a passenger seat, and the side close to a driver's seat of the plate-like portion is formed so as to be disposed in the back of a convex portion formed in the middle of the instrument panel, into which onboard equipment is set.

11 Claims, 9 Drawing Sheets

FOREIGN PATENT DOCUMENTS

| | | | |
|---|---|---|---|
| JP | 2003-191815 | A | 7/2003 |
| JP | 3566065 | B2 | 6/2004 |
| JP | 3654751 | 82 | 3/2005 |
| JP | 2005-238917 | A | 9/2005 |
| JP | 3731436 | B2 | 10/2005 |
| JP | 3830812 | B2 | 7/2006 |
| JP | 2007-290409 | A | 11/2007 |
| JP | 2007290409 | A * | 11/2007 |

OTHER PUBLICATIONS

Hiroyuki Sugawara, Cover Body of Airbag Device, Nov. 8, 2007, JPO, JP 2007-290409 A, Machine translation of Description.*
Search Report issued in counterpart European Application No. 09 006 631.7 dated Aug. 17, 2010 (6 pages).

* cited by examiner

FIG. 3

| PROPERTY EVALUATION AND PRODUCT EVALUATION | | | | SPECIMEN 1 | SPECIMEN 2 | SPECIMEN 3 |
|---|---|---|---|---|---|---|
| PROPERTY EVALUATION | TENSILE BREAK STRENGTH | CLASS 5 | MPa | 8.6 | 15.1 | 9.3 |
| | STRETCH AT BREAK | 50 mm/min | % | 100 | 600 | 200 |
| | BENDING MODULUS OF ELASTICITY | JIS K7203 | MPa | 500 | 620 | 760 |
| | Izod IMPACT STRENGTH | NOTCH, -20°C | kJ/m2 | — | N.B. | 16.5 |
| | | NOTCH, -35°C | kJ/m2 | — | N.B. | 10.7 |
| | | NOTCH, -40°C | kJ/m2 | 9.3 | N.B. | 9.1 |
| | | NOTCH, -45°C | kJ/m2 | 6.1 | 13.3 | — |
| PRODUCT EVALUATION | SURFACE AREA | | cm2 | 1302 | 1302 | 1302 |
| | WEIGHT | | g | — | 546 | — |
| | THICKNESS OF PLATE-LIKE PORTION | | mm | 3 | 3 | 3 |
| | THICKNESS OF HINGE PORTION | | mm | 0.5 | 0.5 | 0.5 |
| | LOAD-DEFLECTION TEST | | mm | — | 2 | — |
| | DEPLOYMENT TEST | LOW TEMPERATURE (-35°C) | | × | ○ | × |
| | | RT | | ○ | ○ | × |
| | | HIGH TEMPERATURE (+95°C) | | ○ | ○ | △ |

FIG. 4
(A) RELATIONSHIP BETWEEN SURFACE AREA AND DEFORMATION OF AIRBAG COVER
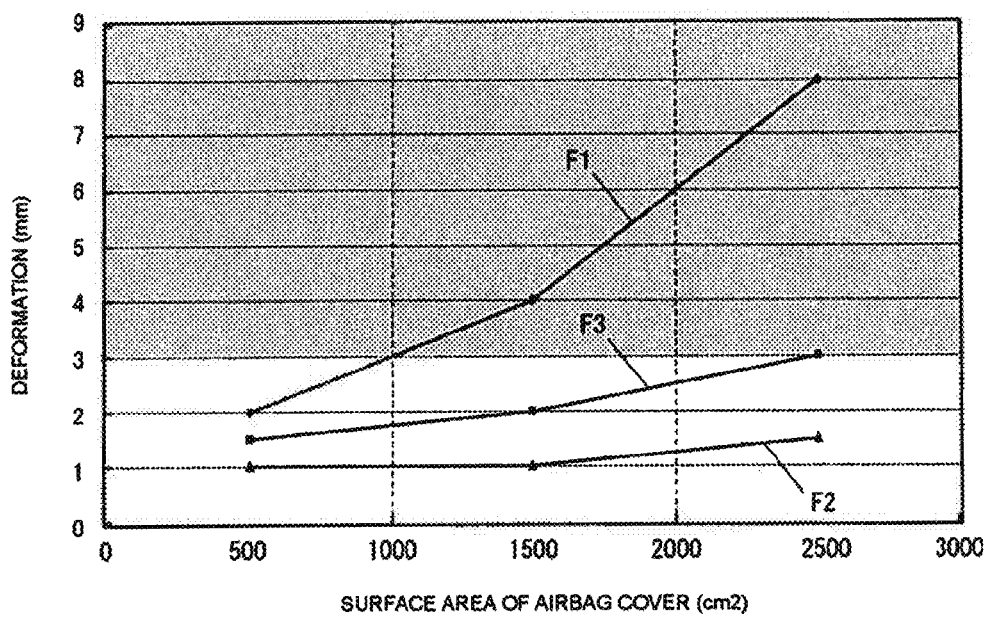
(B) RELATIONSHIP BETWEEN SURFACE AREA AND WEIGHT OF AIRBAG COVER
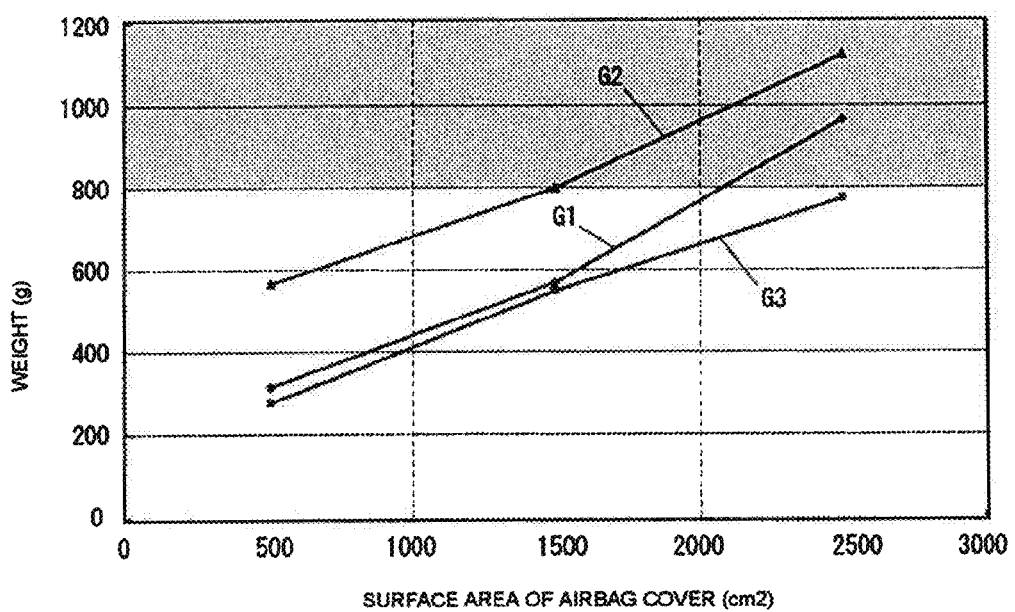

FIG. 5
(A)
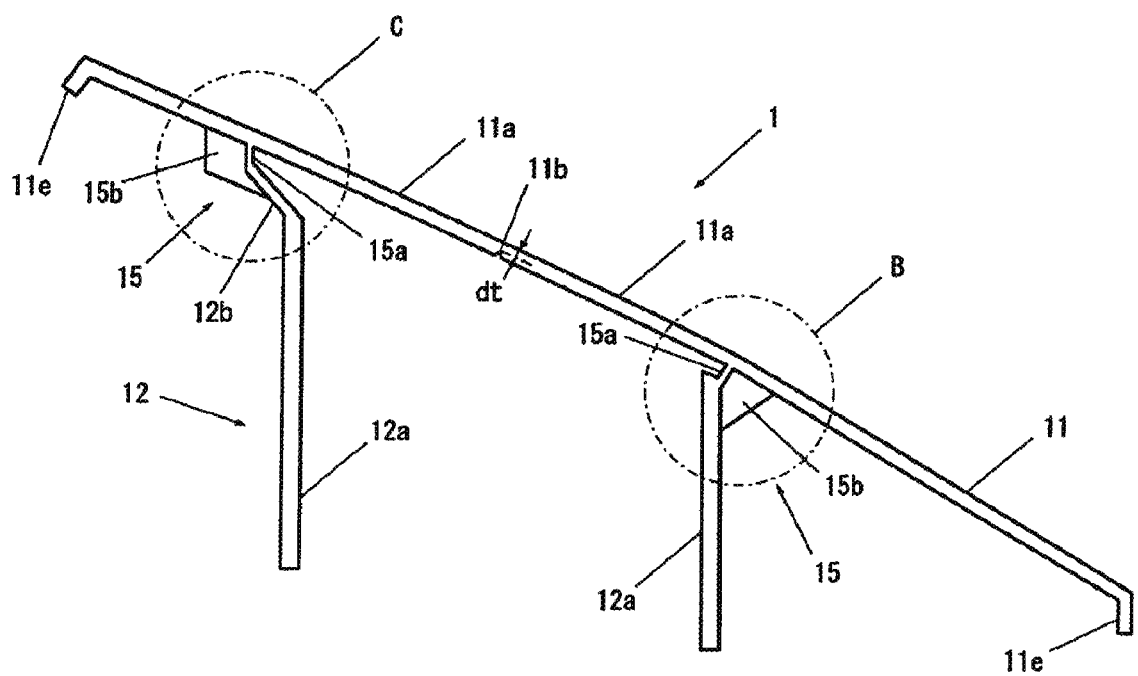
(B)
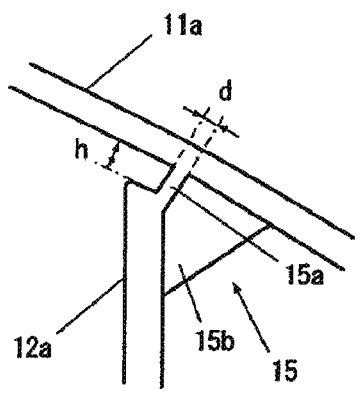
(C)
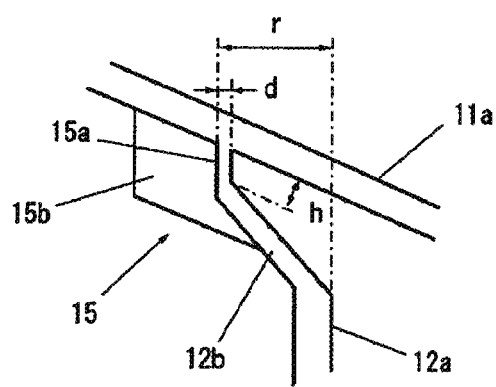

FIG. 6
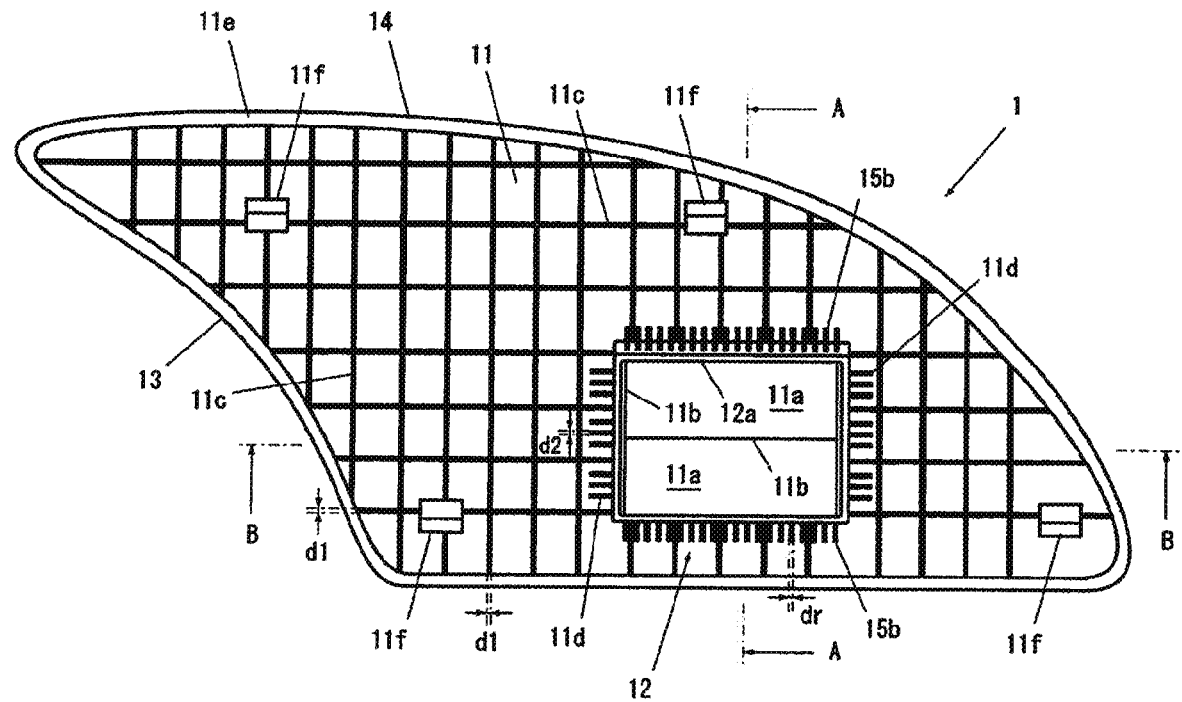
(A)
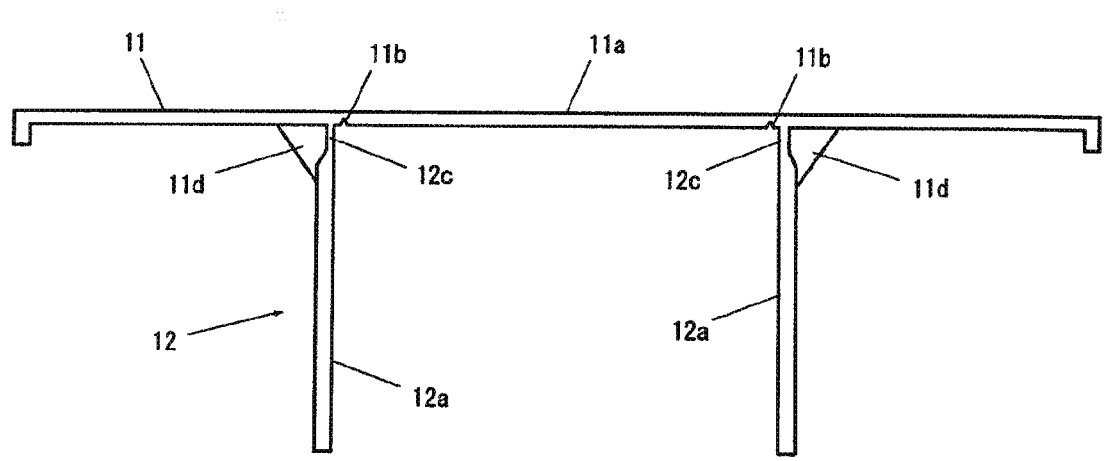
(B)

FIG. 7
(A)
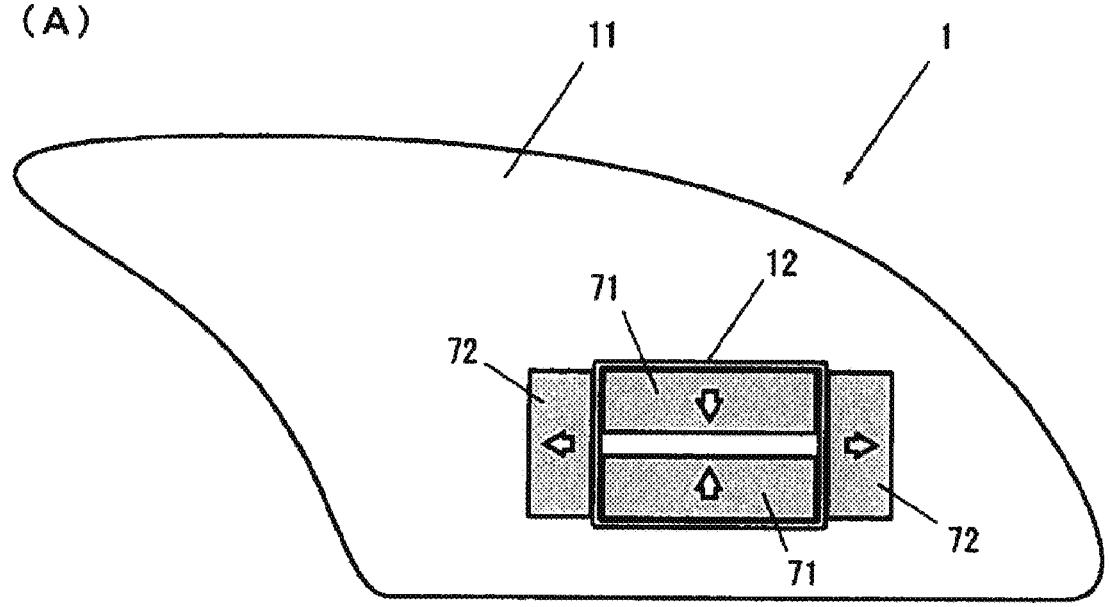
(B)
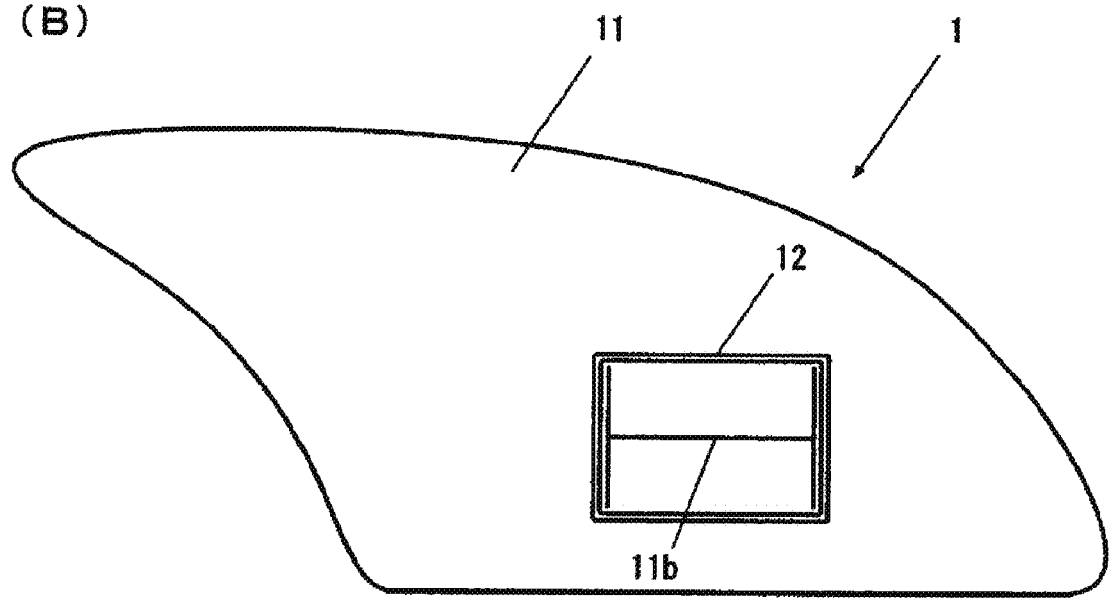

FIG. 8
(A)
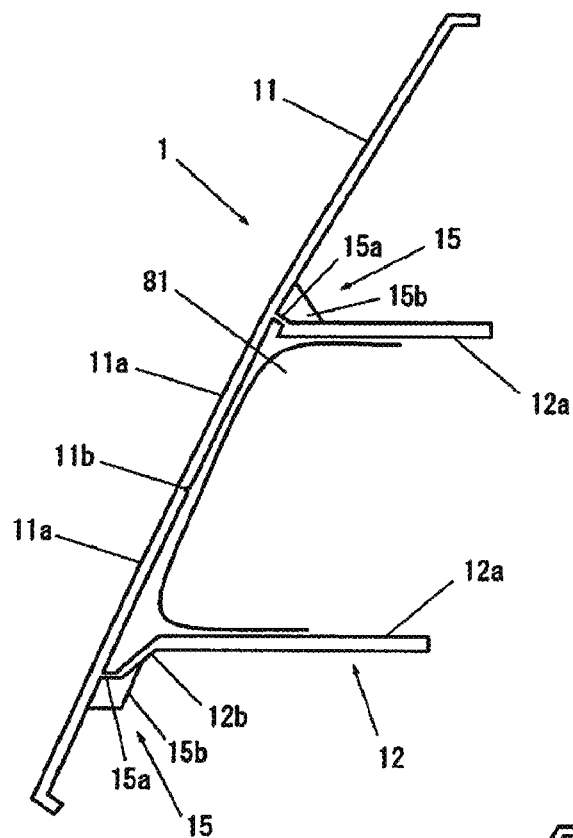
(B)
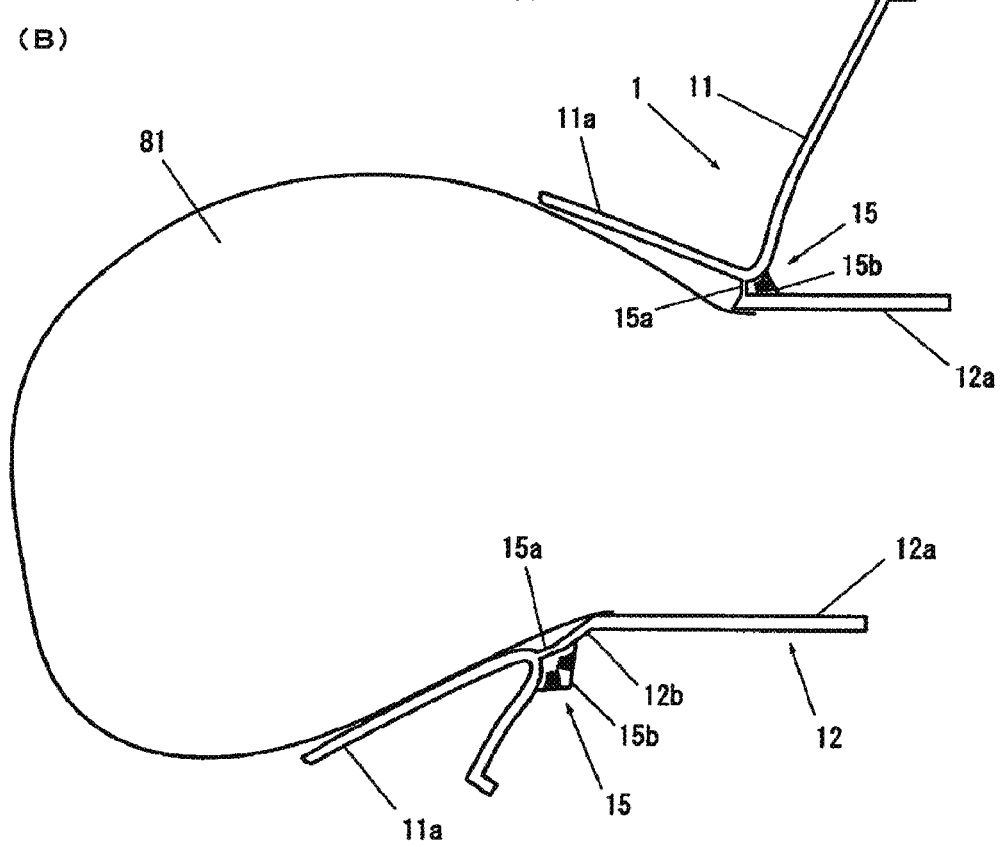

(54) AIRBAG COVER AND AIRBAG APPARATUS

FIELD OF THE INVENTION

The present invention relates to an airbag cover constituting a fracture-opening section and an airbag apparatus provided with such an airbag cover, and more specifically, it relates to an airbag cover suitable for an airbag and an airbag apparatus that are disposed in an instrument panel constituting a vehicle interior surface panel.

BACKGROUND OF THE INVENTION

A vehicle such as an automobile is generally provided with an airbag apparatus that deploys in a passenger compartment to restrain occupants in the event of an emergency such as a crash. Various types of airbag apparatuses have been developed and adopted as such an airbag, including a driver's airbag apparatus mounted inside a steering wheel, a passenger airbag apparatus mounted in an instrument panel, a side airbag apparatus mounted in a vehicle side door or an outboard side of a seat, and a knee airbag apparatus mounted under a dashboard. These airbag apparatuses are mounted inside a vehicle structure so as to be normally hidden, and are designed to split open part of the vehicle structure and inflate and deploy an airbag in a passenger compartment in the event of an emergency such as a crash. Accordingly, a fracture-opening section for an airbag must be normally covered so as to be merged with a vehicle interior surface panel, while it must split open so that an airbag smoothly and rapidly inflates and deploys in the event of an emergency.

The afore mentioned airbag apparatus includes an airbag that is normally stored in a folded state and inflates and deploys in case of an emergency, an inflator for supplying gas to the airbag, a retainer for housing the airbag, and an airbag cover that locks the retainer thereto and constitutes a vehicle interior surface panel. The airbag cover is a resin-molded, thin plate-like body and has a groove called a tear line formed on its back face. A door to be defined when the airbag cover splits open is rotatably supported by a hinge portion formed in the airbag cover and constitutes a fracture-opening section for inflating and deploying an airbag.

Various types of passenger airbag apparatuses to be mounted on an instrument panel have been developed as disclosed in Japanese Unexamined Patent Application Publication No. 2-171364 and Japanese Unexamined Patent Application Publication No. 2003-137057. The airbag apparatus disclosed in Japanese Unexamined Patent Application Publication No. 2-171364 has an airbag cover that is formed so as to be slightly larger than an opening. During the early years of introduction of airbags, an airbag cover was often disposed only at a place necessary for the inflation and deployment of an airbag and was set into an instrument panel, as described in Japanese Unexamined Patent Application Publication No. 2-171364. However, such an airbag cover posed a problem in that it was not aesthetically pleasing because of its exposure to the front of an occupant and also it limited the flexibility of design.

As described in Japanese Unexamined Patent Application Publication No. 2003-137057, disposing an inner case having an airbag module on the back face of an instrument panel has recently become mainstream. In the case of an airbag apparatus of such a type, the instrument panel must be formed of a hard resin because of the necessity of rigidity so that it does not break away at the time of the inflation and deployment of an airbag. To attain this purpose, an inner case made of a soft resin is connected by welding to the back face of the instrument panel so that a door constituting an airbag fracture-opening section turns instead of breaking away.

However, in the case of an airbag apparatus described in Japanese Unexamined Patent Application Publication No. 2003-137057, an instrument panel and an inner case are separately constructed, which causes an increase in the number of parts and processes required for connecting them, resulting in an increase in the cost of an airbag apparatus.

SUMMARY OF THE INVENTION

The present invention has been achieved to solve the above-mentioned problems. Accordingly, an object of the present invention is to provide an airbag cover and an airbag apparatus that achieve cost reduction by forming an instrument panel and an inner case in an integral manner as well as maintaining the rigidity of the instrument panel without degrading an aesthetically pleasing appearance.

According to the present invention, an airbag cover is formed by integrally molding a plate-like portion constituting a vehicle interior surface and an inner case that is disposed on the back face of the plate-like portion and constitutes an airbag inflation and deployment path, wherein the plate-like portion constitutes part of the instrument panel disposed in front of an occupant, and the inner case is formed in a position in front of an occupant in a passenger seat, and the side close to a driver's seat of the plate-like portion is formed so as to be disposed in the back of a convex portion formed in the middle of the instrument panel, into which onboard equipment is set, and the plate-like portion and the inner case are made of an olefin thermoplastic resin which meets: (A) bending modulus of elasticity (JIS-K7203): 500 to 1000 MPa, (B) tensile break strength: 15 to 40 MPa, (C) stretch at break: 600% or more, (D) Izod impact strength: not to break away at −35 degrees centigrade or more.

According to the present invention, an airbag apparatus includes an airbag that is normally folded and inflates and deploys in case of an emergency, an inflator for supplying a gas to the airbag, a retainer that houses at least the airbag and has a hook on an outer surface thereof, and an airbag cover that locks the retainer thereto and constitutes a vehicle interior surface, wherein the airbag cover is formed by integrally molding a plate-like portion constituting part of an instrument panel disposed in front of an occupant and an inner case disposed on the back face of the plate-like portion, which constitutes an airbag inflation and deployment path and has a locking hole at its leg portion to which the hook is locked, wherein the plate-like portion constitutes part of the instrument panel disposed in front of an occupant, and the inner case is formed in a position in front of an occupant in a passenger seat, and the side close to a driver's seat of the plate-like portion is formed so as to be disposed in the back of a convex portion formed in the middle of the instrument panel, into which onboard equipment is set, and wherein the plate-like portion and the inner case are made of an olefin thermoplastic resin which meets: (A) bending modulus of elasticity (JIS-K7203): 500 to 1000 MPa, (B) tensile break strength: 15 to 40 MPa, (C) stretch at break: 600% or more, (D) Izod impact strength: not to break away at −35 degrees centigrade or more.

In the airbag cover and the airbag apparatus, the plate-like portion may have a surface area of 1000 to 2000 $cm^2$ and may have a size approximately three to eight times that of an opening of the airbag, and the opening may be disposed at least 30 mm away from the outer circumferential edge of the plate-like portion.

Also, in the airbag cover and the airbag apparatus, the plate-like portion may have a thickness of 2.5 mm to 3.5 mm, and the leg portion of the inner case may be partially thicker than the plate-like portion.

In addition, in the airbag cover and the airbag apparatus, the plate-like portion may include a door that is formed so as to split open when the airbag inflates and deploys and a hinge portion that rotatably holds the door, and a connecting section with the inner case of the hinge portion may have a thinner portion having a thickness of 0.5 mm to 1.5 mm. The hinge portion may have a plurality of ribs disposed on the external surface of the thinner portion so as to be bendable and bucklable when the airbag inflates and deploys.

Furthermore, the door is formed by a tear line formed in the plate-like portion so as to split open, and the tear line may be formed by machining, laser beam machining, or ultrasonic machining which follows forming of the airbag cover.

The airbag cover and the airbag apparatus according to the present invention solves the problems that have been encountered with a conventional airbag apparatus by providing a medium-size airbag cover because an airbag apparatus of an early date poses an aesthetic problem due to its too small airbag cover while a recent airbag apparatus poses a problem in that its too large airbag cover like the entire instrument panel makes it difficult to keep the rigidity and to prevent the door from breaking away.

The airbag cover and the airbag apparatus according to the present invention can attain a reduction in the number of parts and a reduction of man-hours by integrally molding a plate-like portion and an inner case. In addition, the use of an olefin thermoplastic resin meeting a predetermined requirement in the airbag cover as well as a medium-size plate-like portion constituting part of an instrument panel improves in rigidity of the instrument panel despite the use of the soft resin. Furthermore, disposition of the side of the plate-like portion in the back of a convex portion in the instrument panel allows a seam between the airbag cover and the instrument panel to be disposed so as to be hardly visible to or hidden from occupants in the driver's seat and the passenger seat, thereby keeping the instrument panel aesthetically pleasing.

Also, limitation of the surface area of the plate-like portion to a predetermined size to determine the location of the opening leads to improvement in rigidity of the instrument panel. The plate-like portion having smaller wall thickness ant the inner case leg portion having larger wall thickness allow the plate-like portion to more easily split open and turn at the time of airbag inflation and deployment as well as enhance the rigidity of the inner case leg portion to which the retainer is locked.

A thinner portion formed in a connecting section between the plate-like portion and the inner case suppresses deformation of the connecting section resulting from contraction associated with curing of a resin, which prevents sink from occurring on the surface of the airbag cover, resulting in improvement in the appearance of the airbag cover. In addition, a plurality of ribs disposed on the outer surface of such a thinner portion of the hinge eliminates the necessity for a thinner portion constituting a hinge to be separately formed in the plate-like portion, resulting in a simplified hinge structure. Furthermore, the ribs formed so as to be bendable and bucklable can absorb an impact created at the time of turning of the door, thereby effectively preventing the door from breaking away.

Forming the tear line by any one of machining, laser beam machining, and ultrasonic machining which follows the forming of the airbag cover simplifies the mold of the airbag cover, which reduces the cost for designing and manufacturing the mold, leading to reduction in cost of an airbag apparatus.

BRIEF DESCRIPTION OF THE DRAWINGS

FIG. 1(A) shows an airbag cover according to the present invention. FIG. 1(B) shows a small, conventional airbag cover. FIG. 1(C) shows a large, conventional airbag cover.

FIG. 3 shows the results of property evaluations and product evaluations carried on specimens prepared with an olefin thermoplastic resin (TPO material).

FIG. 4 shows the relationship between material for use in airbag cover and the surface area.

FIGS. 5(A)-5(C) are views showing an airbag cover according to the present invention. FIG. 5(A) is a cross-sectional view. FIG. 5(B) is an enlarged view of a section indicated by "B" in FIG. 5(A). FIG. 5(C) is an enlarged view of a section indicated by "C" in FIG. 5(A).

FIGS. 6(A) and 6(B) are views showing an airbag cover according to the present invention. FIG. 6(A) is a rear view. FIG. 6(B) is a cross-sectional view taken along the line B-B of FIG. 6(A).

FIGS. 7(A) and 7(B) are schematic illustrations showing part of manufacturing process of an airbag cover according to the present invention. FIG. 7(A) shows a molding process of a thinner portion. FIG. 7(B) shows a working process of a tear line.

FIGS. 8(A) and 8(B) are illustrations showing how an airbag inflates and deploys. FIG. 8(A) shows an airbag just before released to the passenger compartment. FIG. 8(B) shows an airbag immediately after released to the passenger compartment.

DETAILED DESCRIPTION OF THE PREFERRED EMBODIMENTS

Figure 1:
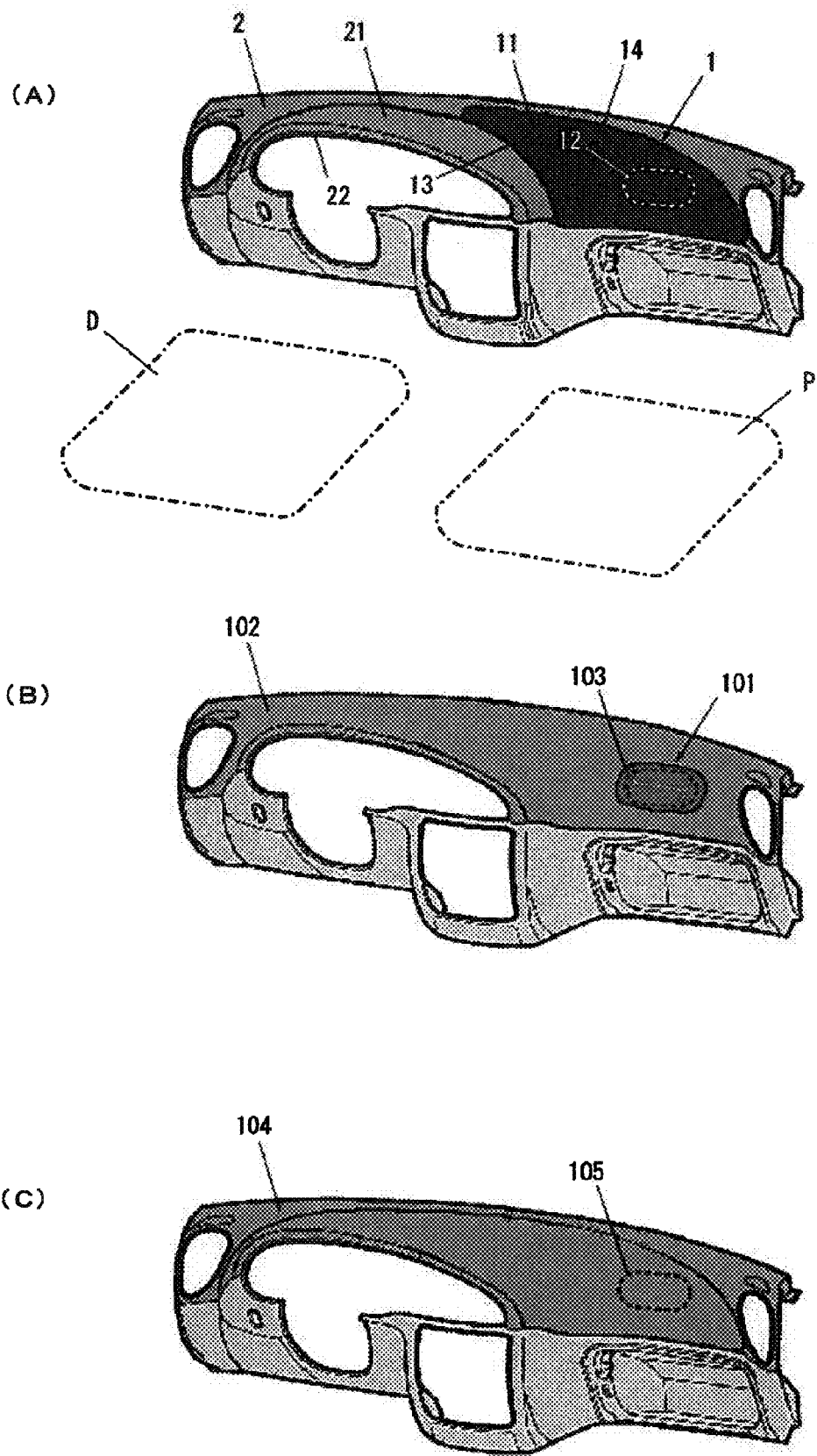
FIGS. 1(A)-1(C) are external views showing an airbag cover according to the present invention and a conventional airbag cover.

An embodiment of the present invention will be described below with reference to FIGS. 1(A) to 9. FIGS. 1(A)-1(C) are external views showing an airbag cover according to the present invention and a conventional airbag cover. FIG. 1(A) shows an airbag cover according to the present invention. FIG. 1(B) shows a small, conventional airbag cover. FIG. 1(C) shows a large, conventional airbag cover.

As shown in FIG. 1(A), an airbag cover according to the present invention is formed by integrally molding a plate-like 11 portion constituting a vehicle interior surface and an inner case 12 that is disposed on the back face of the plate-like portion and constitutes an airbag inflation and deployment path. The plate-like portion 11 constitutes part of the instrument panel 2 disposed in front of an occupant, and the inner case 12 is formed in a position in front of an occupant in a passenger seat P, and the side 13 close to a driver's seat D of the plate-like portion 11 is formed so as to be disposed in the back of a convex portion 21 formed in the middle of the instrument panel 2, into which onboard equipment is set. Views of the driver's seat and the passenger seat show only a seating surface and omit an illustration of a seat back.

The convex portion 21 corresponds to a section called a meter hood or a center instrument panel, and is formed on the instrument panel in the shape of a substantial half-moon or a rectangle. An opening 22 formed inside the convex portion 21 constitutes a space into which a speedometer, a tachometer, a fuel gauge, an air conditioner louver, a control panel, a car audio system, a car navigation system, and a hazard switch are incorporated. The side 13 of the plate-like portion 11 is shaped so as to fit the shape of the back (close to the windshield) of the convex portion 21. For example, as shown in FIG. 1(A), if the back of the convex portion 21 is formed in a curved shape, the side 13 is curved so as to fit the curved shape. Needless to say, if the back of the convex portion 21 is formed in a linear or rectangular shape, the side 13 is formed to fit the linear or rectangular shape. The other side 14 of the plate-like portion 11 is formed to fit the shape of the windshield close to the instrument panel 102. The use of the airbag cover 1 employing the plate-like portion 11 of such a shape allows a seam between the airbag cover 1 and the instrument panel 2 to be disposed so as to be hardly visible to or completely hidden from occupants in a driver's seat and a passenger seat, thereby keeping an aesthetically pleasing appearance. In particular, in order to make the seam less visible to the occupant in the passenger seat P, the end of the side 13 of the plate-like portion is disposed in the back of the convex portion 21 so as to be closer to the driver's seat D (to the side of the driver's seat D of the center line of the instrument panel 102). Although FIG. 1(A) shows that the side 13 of the plate-like portion 11 is shaped so as to be disposed close to the driver's seat D along the back face of the convex portion 21, such a shape is not limited to this. Any disposition of the seam between the airbag cover 1 and the instrument panel 2 in a position completely hidden from or hardly visible to the occupants using the convex portion 21 poses no problem. For example, the side 13 of the plate-like portion 11 may be shaped in such a manner that the side 13 of the plate-like portion 11 constitutes part of the back face of the convex portion 21, or be shaped to be disposed in the back face without fitting the shape of the convex portion 21, or be shaped so as to be disposed close to the passenger seat P.

An airbag cover according to the present invention is compared to a conventional airbag cover in terms of structure. As shown in FIG. 1(B), a conventional, small airbag cover 101 is disposed in an instrument panel 102 so as to be located in front of a passenger seat. Also, the airbag cover 101 has an inner case 103 formed in an integral manner on an inner surface thereof. In the conventional, small airbag cover 101, a seam between the airbag cover 101 and the instrument panel 103 is exposed to the front face, which degrades its appearance.

A large, conventional airbag cover 104 as shown in FIG. 1(C) constitutes an instrument panel itself ranging from the passenger seat to the driver's seat, and has an inner case 105 as a separate component connected by welding to an inner surface thereof Due to being the instrument panel itself the large airbag cover 104 has no seam and therefore provides an aesthetically feasible appearance. In contrast, due to its large size the airbag cover 104 has a problem of low rigidity and a door that breaks away. To solve these problems, an inner case 105 is separately constructed and mounted on the airbag cover 104 (instrument panel). However, the instrument panel (airbag cover 104) and the inner case 105 being separately constructed results in an increase in the number of parts and manufacturing processes, leading to increased cost of an airbag apparatus.

The present invention attains a reduction in the number of parts and a reduction of man-hours by integrally molding the plate-like portion 11 and the inner case 12. In addition, the rigidity of the instrument panel 2 is improved by using an olefin thermoplastic resin meeting a predetermined requirement in the airbag cover 1 and forming a plate-like portion 11 into a medium-size constituting part of an instrument panel 2. Furthermore, a seam between the airbag cover and the instrument panel is disposed so as to be hardly visible to or hidden from occupants in the driver's seat D and the passenger seat P by disposing the side 13 of the plate-like portion 11 in the back of a convex portion 21 in the instrument panel 2, thereby keeping the instrument panel aesthetically pleasing.

Figure 2:
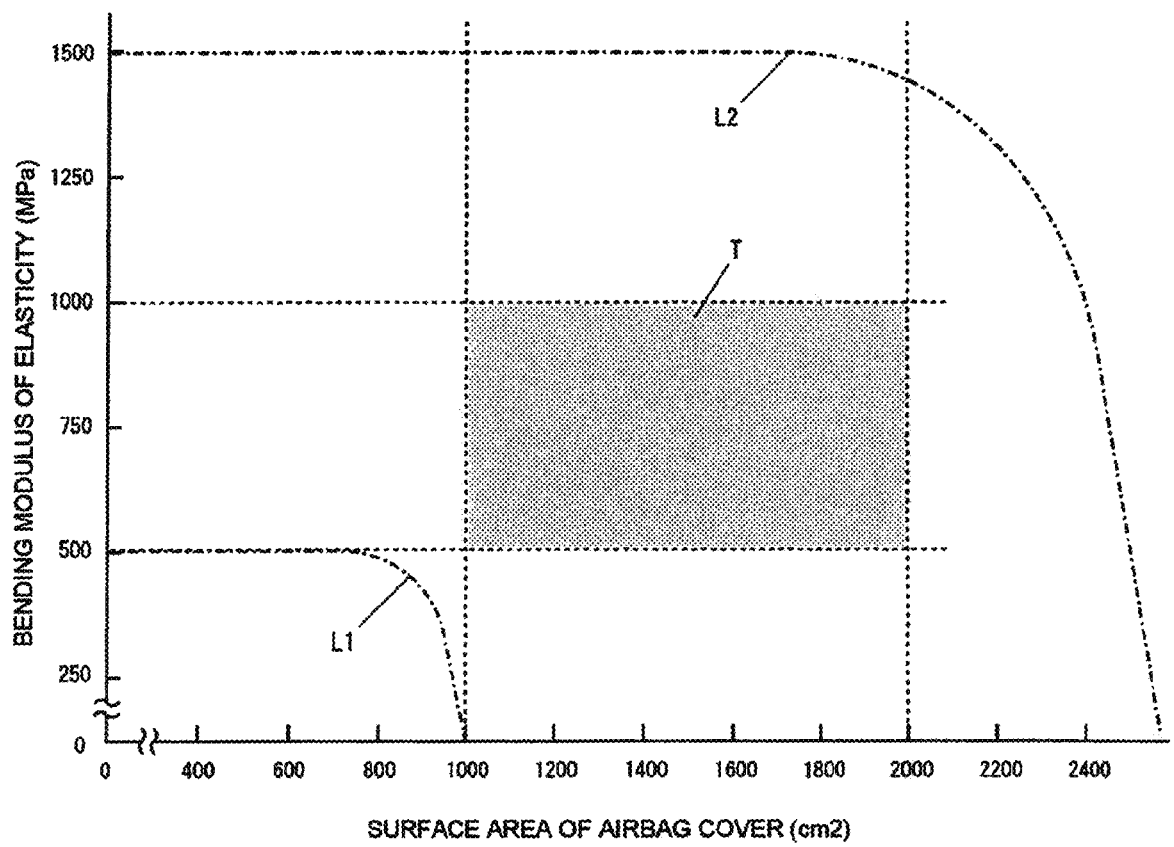
FIG. 2 is a diagram showing a target of an airbag cover according to the present invention.

FIG. 2 is a diagram showing a target of an airbag cover according to the present invention. In this figure, the horizontal axis depicts a surface area ($cm^2$) of an airbag cover, while the vertical axis depicts the bending modulus of elasticity (MPa).

Curves L1, L2 indicated by dashed-dotted lines in FIG. 2 depict a relationship between a surface area and bending modulus of elasticity of conventional airbag covers 101, 104. The curve L1 represents a small airbag cover 101 as shown in FIG. 1(B), where its surface area is less than 1000 cm2 and bending modulus of elasticity is up to approximately 500 MPa. The airbag cover 101 represented by the curve L1, is small, and therefore can maintain its rigidity even if it is made of a soft resin like an olefin thermoplastic resin (TPO material). In contrast, the curve L2 represents a large airbag cover 104 as shown in FIG. 1(C), where its surface area is more than 2000 cm2 and bending modulus of elasticity is up to approximately 1500 MPa. Due to its large size, the airbag cover 104 represented by the curve L1 cannot use a soft resin like TPO material, but use a hard resin like polypropylene resin (PP material). There is a medium-size airbag cover having a surface area of 1000 to 2000 cm2, which constitutes the entire instrument panel. Like the large airbag cover 104, the medium-size airbag cover uses a hard resin to keep its rigidity since a soft resin does not provide such rigidity.

The airbag cover 1 according to the present invention is targeted at an airbag cover which falls within the shaded region T in FIG. 2. In other words, the airbag cover according to the present invention is a medium-size airbag cover having surface area of 1000 to 2000 cm2 with bending modulus of elasticity of 500 to 1000 MPa. In addition, the airbag cover according to the present invention uses an olefin thermoplastic resin (TPO), a soft resin, because it is formed by integrally molding the plate-like portion 11 and the inner case 12. Use of the olefin thermoplastic resin (TPO) allows bending modulus of elasticity to be increased to up to 1000 MPa by blending its components such as polypropylene resin, ethylene propylene copolymer rubber, and ethylene octane copolymer rubber in an appropriate manner.

As described above, the airbag cover according to the present invention uses an olefin thermoplastic resin (TPO) that is a soft resin. Property evaluation as to bending modulus of elasticity only is insufficient for product commercialization. FIG. 3 shows the results of a property evaluation and product evaluation carried on specimens prepared with an olefin thermoplastic resin (TPO material). In this figure, a hyphen ("-") indicates no data obtained for an appropriate item.

Specimens 1 to 3 have components such as polypropylene resin, ethylene propylene copolymer rubber, and ethylene octane copolymer rubber blended in such a manner that their bending modulus of elasticity pursuant to JIS-K7203 falls within 500 to 1000 MPa, as shown in the property evaluation column. More specifically, specimen 1 had bending modulus of elasticity of 500 MPa, specimen 2 had bending modulus of elasticity of 620 MPa, and specimen 3 had bending modulus of elasticity of 760 MPa. Then, a property evaluation was carried out on each of specimens 1 to 3 in terms of tensile break strength, stretch at break, and Izod impact strength.

For tensile break strength and stretch at break, tensile tests were performed on a JIS-K6251 dumbbell specimen No. 5 at a speed of 50 mm/min. These tests show that specimen 1 has tensile break strength of 8.6 MPa, specimen 2 has tensile break strength of 15.1 MPa, and specimen 3 has tensile break strength of 9.3 MPa. Also, specimen 1 has stretch at break of 100%, specimen 2 has stretch at break of 600%, and specimen 3 has stretch at break of 200%.

For Izod strength, Izod impact strength tests were performed on specimens having a notch formed therein at −20, −35, −40, and −45 degrees centigrade. These tests show that specimen 3 breaks away when subjected to impact energy of 16.5 kj/m$^2$ at −20 degrees centigrade, breaks away when subjected to impact energy of 10.7 kj/m$^2$ at −35 degrees centigrade, and breaks away when subjected to impact energy of 9.1 kj/m$^2$ at −40 degrees centigrade. Generally, any component to be mounted on a vehicle must withstand temperatures ranging from −35 (low temperature) to 85 degrees centigrade (high temperature). From this point of view, specimen 3 already breaks away at temperatures of −20 to −40 degrees centigrade, and did not receive the test at −45 degrees centigrade since the test at −45 degrees centigrade is judged to be not necessary. Also, specimen 2 does not break (N.B.) away at −20, −35, and −40 degrees centigrade, and breaks away when subjected to impact energy of 13.3 kj/m$^2$ at −45 degrees centigrade. In addition, specimen 1 breaks away when subjected to impact energy of 6.1 kj/m$^2$ at −45 degrees centigrade, and breaks away when subjected to impact energy of 9.3 kj/m$^2$ at −40 degrees centigrade. The test results of specimen 1 at −40 and −45 degrees centigrade clearly show that breakage occurs even at more than −35 degrees centigrade. Accordingly, tests at −20 and −35 degrees centigrade were not performed.

Furthermore, product evaluations were performed on specimens 1 to 3. In these product evaluations, a medium-size airbag cover having a surface area of 1302 cm$^2$ (integral inner case) was prepared, and thickness of the plate-like portion and the thickness of the hinge portion were set at 3 mm and 0.5 mm, respectively. Also, airbag deployment performance tests were performed on airbag covers prepared from specimens 1 to 3 at a low temperature (−35 degrees centigrade), a room temperature, and a high temperature (85 degrees centigrade). These evaluations show that an airbag cover as specimen 1 does not pose any problem at the room temperature and the high temperature, but produces the problem that its hinge fractures and its door breaks away at the low temperature. Also, an airbag cover as specimen 2 does not pose any problem at all these temperatures with no breaking away of the door. Furthermore, an airbag cover as specimen 3 does not have the problem of breaking away of the door at the high temperature, but experiences the problem of partial fracture of the hinge portion, and experiences the problem of fracture of the hinge and breaking away of the door at the low temperature and the room temperature.

The above-described results of the property evaluation and the product evaluation reveal that specimen 2 is suitable to the airbag cover according to the present invention. In addition, comparison of the results of the property evaluation performed on specimens 1 to 3 finds that tensile break strength of 15 MPa or more is preferable, and experience shows that 40 MPa is more preferable. Furthermore, stretch at break of 600% or more is preferable. However, according to the property evaluation in FIG. 3, "600% or more" means that 100% or 200% is not included and that stretch at break of about 500% may lead to product commercialization if the tensile break strength is adjusted. Also, it is preferable that a specimen having a notch formed does not break (N.B.) away when subjected to Izod impact strength tests at −35 degrees centigrade or more. In other words, it is preferable that the material constituting the airbag cover 1 (plate-like portion 11 and inner case 12) according to the present invention is an olefin thermoplastic resin (TPO material) which meets: (A) bending modulus of elasticity (JIS-K7203): 500 to 1000 MPa, (B) tensile break strength: 15 to 40 MPa, (C) stretch at break: 600% or more, (D) Izod impact strength: not to break away at −35 degrees centigrade or more.

Described below is the fact that an airbag cover employing an olefin thermoplastic resin (TPO material) of the above-mentioned specimen 2 is suitable for a medium-size airbag cover. FIGS. 4(A) and 4(B) show the relationship between material for use in airbag cover and the surface area. FIG. 4(A) shows the relationship between airbag cover surface area and deflection. FIG. 4(B) shows the relationship between airbag cover surface area and weight.

In FIG. 4(A), F1 indicates the test results for a TPO material used in a small, conventional airbag cover, F1 indicates those for a PP material used in a large, conventional airbag cover, and F3 indicates those for a TPO material of the afore-mentioned specimen 2. Airbag covers having surface area of 500 cm$^2$, 1500 cm$^2$, and 2500 cm$^2$ respectively, are prepared, and deflection is measured when they are subjected to a load equal to an impact created at the time of airbag inflation and deployment. As a result, an airbag cover having surface area of 500 cm$^2$ exhibits a deflection of 2 mm for F1, 1 mm for F2, and 1.5 mm for F3. Also, an airbag cover having surface area of 1000 cm$^2$ exhibits a deflection of 4 mm for F1, 1 mm for F2, and 2 mm for F3. Furthermore, an airbag cover having surface area of 2500 cm$^2$ exhibits a deflection of 8 mm for F1, 1.5 mm for F2, and 3 mm for F3. For this test, the allowable limit for deflection is empirically 3 mm. Accordingly, an airbag cover whose deflection falls within the shaded region in FIG. 4(A) is not suitable for product commercialization. As for a medium-size airbag cover having surface area of 1000 to 2000 cm$^2$, the TPO material (F1) used in the small, conventional airbag cover is not suitable for the medium-size airbag cover since its deflection exceeds 3 mm.

In FIG. 4(B), G2 indicates the test results for a TPO material used in a small-sized, conventional airbag cover, G2 indicates those for a PP material used in a large, conventional airbag cover, and G3 indicates those for a TPO material of the afore-mentioned specimen 2. Airbag covers having surface area of 500 cm$^2$, 1500 cm$^2$, and 2500 cm$^2$, respectively, are prepared and weighed. As a result, an airbag cover having surface area of 500 cm$^2$ weighs about 310 grams for G1, about 580 grams for G2, and about 290 grams for G3. Also, an airbag cover having surface area of 1000 cm$^2$ weighs about 580 grams for G1, about 800 grams for G2, and about 570 grams for G3. Furthermore, an airbag cover having surface area of 2500 cm$^2$ weighs about 970 grams for G1, about 1100 grams for G2, and about 780 grams for G3. For this test, the allowable limit of weight is empirically about 1000 grams, but is set at 800 grams since reduced weight is preferable. Accordingly, an airbag cover whose weight falls within the shaded region in FIG. 4(B) is not suitable for product commercialization. As for a medium-size airbag cover having surface area of 1000 to 2000 cm$^2$, the PP material (G2) used in the large, conventional airbag cover is not suitable for the medium-size airbag cover since its weight exceeds 800 grams.

As described above, the TPO material of specimen 2 is suitable for a medium-size airbag cover having surface area of 1000 to 2000 cm$^2$ in terms of deformation and weight. On the contrary, the TPO and PP material that are used in conventional airbag covers are not suitable for the medium-sized airbag cover unless modified.

The specific shape of the airbag cover according to the present invention is described below. FIGS. 5(A)-5(C) are views showing an airbag cover according to the present invention. FIG. 5(A) is a cross-sectional view. FIG. 5(B) is an enlarged view of a section indicated by "B" in FIG. 5(A). FIG. 5(C) is an enlarged view of a section indicated by "C" in FIG. 5(A). FIGS. 6(A) and 6(B) are views showing an airbag cover according to the present invention. FIG. 6(A) is a rear view. FIG. 6(B) is a cross-sectional view taken along the line B-B of FIG. 6(A). The cross-sectional view in FIG. 5(A) is a cross-sectional view taken along the line A-A of FIG. 6(A).

The airbag cover as shown in FIGS. 5(A)-5(C) and 6(A)-6(B) is an airbag cover formed by integrally molding a plate-like portion 11 constituting a vehicle interior surface and an inner case 12 that is disposed on the back face of the plate-like portion 11 and constitutes an airbag inflation and deployment path. The plate-like portion 11 include a door 11a formed so as to split open when the airbag inflates and deploys, and a hinge 15 that rotatably supports the door 11a. The hinge 15 includes a thinner portion 15a formed in a connecting section between the an inner case 12 and the plate-like portion 11 and a plurality of ribs 15b disposed on the outer surface of the thinner portion 15a so as to be bendable and bucklable when the airbag inflates and deploys.

The plate-like portion 11 is a component that constitutes part of a vehicle interior surface of an instrument panel 2 and is constructed to have surface area of 1000 to 2000 cm$^2$. Also, the plate-like portion 11 has a wall thickness of 2.5 to 3.5 mm which is smaller than conventional ones. As shown in FIG. 6(A), the plate-like portion 11 has an inner case 12 installed upright on a rear face thereof. The inner case 12 is disposed at least 30 mm away from a rim 11e of the plate-like portion 11. The plate-like portion 11 has a substantially H-shaped tear line 11b formed at its portion corresponding to the inner case 12, the tear line 11b being thinner (wall thickness: dt) than the plate-like portion 11. When the airbag inflates, the tear line 11b allows the plate-like portion 11 to split open therealong and turn like double doors, thereby allowing the airbag to be released into the passenger compartment for inflation and deployment. The portions that split open along the tear line 11b constitute doors 11a. The opening formed by opening doors 11a generally has an area of 250 to 300 cm$^2$. Accordingly, the plate-like portion 11 has a surface area approximately 3 to 8 times that of the opening.

As shown in FIG. 6(A), the plate-like portion 11 has at least one first reinforcement rib 11c disposed in a reticular pattern on a back face thereof for reinforcement. The first reinforcement rib 11c is disposed in an appropriate manner, depending on the size and shape of the plate-like portion 11, and its shape is not limited to the shape as shown in FIG. 6(A). The first reinforcement rib 11c has a height of, for example, 2 to 5 mm, while it has a pitch of, for example, 15 to 30 mm. Also, the thickness d1 of the first reinforcement rib 11c may be substantially equal to that of a rib 15 to be mentioned later. Preferably, the thickness d1 of the first reinforcement rib 11c is 1.0 to 1.3 mm. The first reinforcement rib 11c formed to have smaller thickness than a conventional reinforcement rib (1.3 to 1.8 mm thick) suppresses the occurrence of a sink, thereby enhancing the appearance of the airbag cover 1. If the thickness d1 larger than 1.3 mm does not cause the occurrence of a sink due to the relationship with the height of the first reinforcement rib 11c, the same thickness as conventional reinforcement ribs may be adopted.

As shown in FIG. 6(A), a plurality of second reinforcement ribs 11d for reinforcing the inner case 12 are disposed at a leg portion 12a of the inner case 12 disposed along the tear line 11b. As shown in FIG. 6(B), the second reinforcement rib 11d has a substantially triangle shape so as to be connected to the back face of the plate-like portion 11 and the leg portion 12a. Like the first reinforcement rib 11c, the second reinforcement rib 11d is a rib for reinforcement, and therefore its thickness d2 is the same as the thickness d1 of the first reinforcement rib 11c. However, since the second reinforcement rib 11d is often formed to have a larger height than the first reinforcement rib 11c, preferably the second reinforcement rib 11d has substantially the same thickness (for example, 1.0 to 1.3 mm) as the rib 15b.

As shown in FIGS. 5(A) and 6(A), the plate-like portion 11 has a rim 11e formed at its outer circumferential edge and a clip 11f installed upright on its back face for locating itself, and is mounted to the instrument panel 2 by connecting the clip 11f to a locking hole formed in the instrument panel 2 and setting the rim 11e into an opening in the instrument panel 2.

As shown in FIGS. 5(A) and 6(A), the inner case 12 is constructed with the tubular leg 12 installed upright in a rectangular shape on the back face of the plate-like portion 11. Since the plate-like portion 11 is mounted to the instrument panel 2 in such a manner that its top surface faces occupants and the airbag is inflated and deployed toward these occupants, the inner case 12 is often slanted in relation to the plate-like portion I1. The airbag cover 1 according to the present invention is formed by resin-molding of the inner case 12 and the plate-like portion 11 in an integral manner. Such an integral airbag cover 1 experience a great change in thickness of a resin layer at a connecting section between the plate-like portion 11 and the leg portion 12a of the inner case 12, which causes a significant contraction when a resin sets and a concave or so called a sink on the plate-like portion 11 along the leg portion 12a, degrading the appearance of the airbag cover 1. In order to suppress the occurrence of the sink or minimize the sink to such a degree that it is invisible to the human eye, a connection section between the plate-like portion 11 and the leg portion 12a of the inner case 12 must be thinned as much as possible. Accordingly, the airbag cover as shown in the figure has the connection section between the plate-like portion 11 and the leg portion 12a of the inner case 12 formed to be as thinner as possible, whereby a bendable portion (that is, a thinner portion 15a) is utilized as a hinge portion 15.

The hinge portion 15 is a portion which allows the door 11a to turn toward the top surface of the plate-like portion 11 to form a release section along the inner case 12, through which the airbag is smoothly released into the passenger compartment. Since the function of the hinge portion 15 affects how the airbag deploys, the hinge portion 15 must allow the door 11a to turn as soon as the airbag inflates and deploys. In addition, the hinge portion 15 must anchor the door 11a firmly to the plate-like portion 11 to ensure that the door 11a does not break away. In other words, the hinge portion 15 must be bendable and resistant to deformation.

As shown in FIG. 5(B), the hinge portion 15 indicated by "B" in FIG. 5(A) connects the plate-like portion 11 with the leg portion 12a of the inner case 12 and has a thinner portion 15a formed to have a smaller thickness than the leg portion 12a or the plate-like portion 11 and a rib 15b disposed on the outside of the thinner portion 15a. The thickness d of the thinner portion 15a is substantially equal to or less than the thickness dt of the tear line 11b. Specifically, the thickness d of the thinner portion 15a is preferably 0.5 to 1.5 mm. The thinner portion 15a formed to be thin to such a degree suppresses the occurrence of a sink and minimizes the sink to such a degree that it is invisible to the human eye, thereby enhancing the appearance of the airbag cover 1. Also, the thinner portion 15a is formed on the outside of the inner case 12 so as to be slanted to allow the door 11a to easily turn. The height of the thinner portion 15a is set at, for example, 3 to 5 mm.

As shown in FIG. 5(B), the rib 15b is formed in a trapezoidal shape so as to connect the back face of the plate-like portion 11, the thinner portion 15a, and leg portion 12a. The rib 15b must be a component for reinforcing the thinner portion 15a as well as a bendable and bucklable component which allows the door 11a to smoothly turn. In addition, the thickness dr of the rib 15b must be reduced to such a degree that a sink does not occur on the surface of the plate-like portion 11 since the rib 15b is connected to the back face of the plate-like portion 11. Consequently, the thickness dr of the rib 15b is larger than the thickness d of the thinner portion 15a and smaller than the thickness of conventional reinforcement ribs. Specifically, the thickness dr of the rib 15b is preferably 1.0 to 1.3 mm. The strength of the rib 15b can be adjusted by the number of the ribs and the ribs are continuously disposed at a pitch of 3 to 15 mm. In particular, disposition at a pitch of 4 to 10 mm is effective. The disposition of the rib 15b on the outside of the thinner portion 15a reinforces the thinner portion 15 as well as effectively absorbs an impact generated at the time of turning door by bending and buckling. If the strength of the rib 15b can be sufficiently adjusted by the number (pitch) of ribs, the thickness dr of the rib 15b may be substantially equal to the thickness d of the thinner portion 15a.

As shown in FIG. 5(C), the thinner portion 15a may be formed in an extension 12b extending from the inner case 12. As shown in FIG. 6(A), the extension 12b extends outward over the entire hinge portion 15. As described above, the extension 12b formed in the leg portion 12a of the inner case 12 allows the pivot of the door 11a to be shifted outward by a distance r from the inner face of the inner case 12, thereby enabling the door 11a to more easily turn. As shown in FIG. 5(C), the rib 15b may be formed in a substantially triangle shape so as to connect the back face of the plate-like portion 11, the thinner portion 15a, and leg portion 12a.

A connecting section between the plate-like portion 11 and the inner case 12 is also present at a portion which does not constitute the hinge portion 15, namely, the leg portion 12a disposed along the tear line 11b and reinforced by the second reinforcement rib 11d. As shown in FIG. 6(B), a thinner portion 12c that is provided under substantially the same conditions as the thinner portion 15a may be formed at this connection section. The thinner portion 12c does not constitute the hinge portion 15, and therefore needs not consider ease of turning of the door 11a and may be formed so as to extend straight toward the plate-like portion 11 from the leg portion 12a. Although the thinner portion 12c is formed along the inner surface of the inner case 12 in FIG. 6(B), it may be formed on the external surface of the inner case 12 or in the middle of the leg portion 12a.

FIGS. 7(A) and 7(B) are schematic illustrations showing part of manufacturing process of an airbag cover according to the present invention. FIG. 7(A) shows a molding process of a thinner portion. FIG. 7(B) shows a working process of a tear line. The rib 15b, the first reinforcement rib 11c, and the second reinforcement rib 11d are omitted in these figures. When the afore-mentioned thinner portions 15a, 12c are formed in a connecting section between the plate-like portion 11 and the inner case 12, molds 71, 72, for example, as shown in FIG. 7(A) may be used. When the thinner portion 15a is formed, a pair of molds 71, 72 are disposed inside the inner case 12 for resin molding. After a resin sets, each of the molds 71 is moved in the direction by an arrow in the figure and removed from the resin molding. When the thinner portion 12c is formed, a pair of molds 71, 72 are disposed on the outside of the inner case 12 for resin molding. After a resin sets, each of the molds 72 is moved in the direction by an arrow in the figure and removed from the resin molding.

As shown in FIG. 7(B), the tear line 11b is formed in a substantial H shape by machining, laser beam machining, or ultrasonic machining after molding of the airbag cover 1. This simplifies the mold of the airbag cover 1, reducing the cost of mold design and manufacturing.

The effect of the airbag cover 1 is described below. FIGS. 8(A) and 8(B) are illustrations showing how an airbag inflates and deploys. FIG. 8(A) shows an airbag just before released to the passenger compartment. FIG. 8(B) shows an airbag immediately after released to the passenger compartment. The reference numerals and symbols in FIG. 8 refer to the same components as those of the airbag cover 1 with the same reference numerals and symbols in FIGS. 5 and 6, and repeated description are omitted.

As shown in FIG. 8(A), when receiving gas supply from an inflator (not illustrated) in the event of an emergency such as a crash, an airbag 81 begins to inflate in an inner case 12 and comes into contact with doors 11a of a plate-like portion 11. Then, due to the pressure exerted by the inflating airbag the doors 11a split open along a tear line 11b formed to have a smaller wall thickness. Like double-doors, the doors 11a turn upward and downward, respectively, about a hinge portion 15 as a supporting point, as shown in FIG. 8(B). Since the hinge 15 has a thinner portion 15a formed to have a smaller wall thickness, the plate-like portion 11 deforms around the thinner portion 15a, functioning as the hinge portion 15 for the doors 11a.

As described above, the thinner portion 15a has a thickness d equal to or less than that of the tear line 11b. However, a reinforcement formed by a rib 15b having a larger thickness dr than the tear line 11b and the thinner portion 15a prevents the thinner portion 15a from fracturing when the thinner portion 15a is subjected to stress created by turning doors 15a. To effectively prevent the thinner portion 15a from fracturing, the thickness dr, the number of the ribs (pitch), or the volume can be adjusted such that the thinner portion 15a withstands the stress created at the hinge portion 15 when the airbag 81 inflates and deploys.

As shown in FIG. 8(B), when each of the doors 11a turns about the hinge portion 15 as a supporting point, the hinge portion 15 and the plate-like portion 11 in the vicinity deform in conjunction with turning doors, causing the rib 15b to be compressed by the plate-like portion 11, the thinner portion 15a, and the leg portion 12a (including the extension 12b). As the hinge portion 15 deforms, the rib 15b gradually bends and finally buckles. The bending and buckling rib 15b effectively absorbs impact created by centrifugal force involved in turning doors 11a, thereby allowing the doors 11a to smoothly turn and preventing the doors 11a from breaking away. An extension 12b formed at the leg portion 12a of the inner case 12 allows the supporting point of the doors 11a to be shifted outward, which causes the doors 11a to more easily turn. As shown in FIG. 8(B), this enables the door 11a connected to the hinge 15 having the extension 12b to turn earlier than the other door 11a. Such a time difference involved in the turning of the doors 11a provides directional characteristics to the inflation and deployment of the airbag 81, thereby allowing the airbag 81 to be effectively inflated and deployed in the desired direction (toward the occupants).

Figure 9:
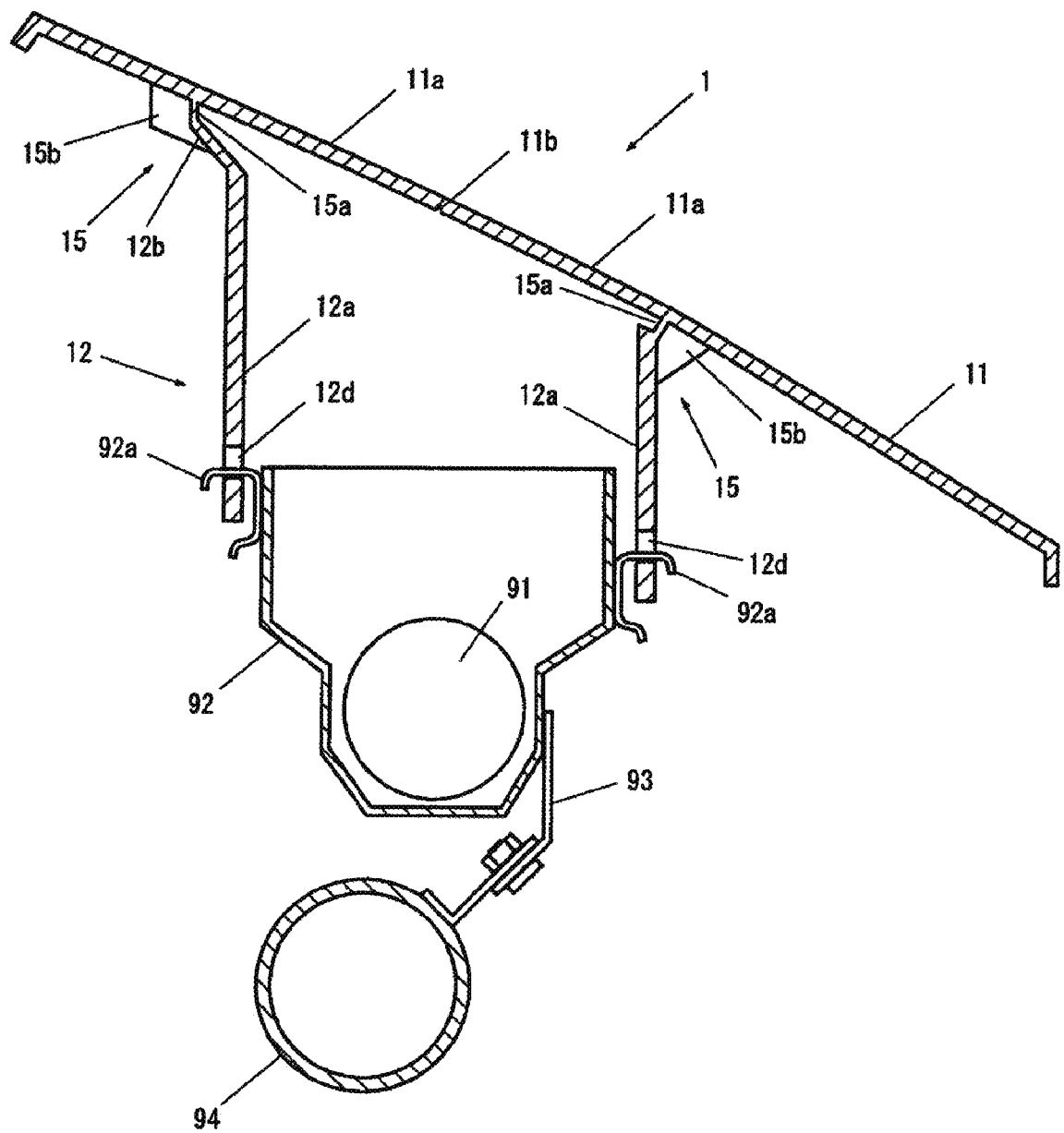
FIG. 9 is a cross-sectional view of an airbag according to the present invention.

An airbag apparatus according to the present invention is described below. FIG. 9 is a cross-sectional view of an airbag according to the present invention. The reference numerals and symbols in FIG. 9 refer to the same components as those of the airbag cover 1 with the same reference numerals and symbols in FIGS. 5 and 6, and repeated description are omitted.

An airbag apparatus as shown in FIG. 9 includes an airbag (not illustrated) that is normally stored in a folded state and inflates and deploys in the event of an emergency, an inflator 91 for supplying gas to the airbag, a retainer 92 that at least stores the airbag and has a hook 92 provided on an external surface thereof, and an airbag cover 1 which locks the retainer 92 thereto and constitutes a vehicle interior surface, wherein the airbag cover 1 is formed by integrally molding a plate-like portion 11 constituting part of an instrument panel 2 disposed in front of an occupant and an inner case 12 disposed on the back face of the plate-like portion 11, which constitutes an airbag inflation and deployment path and has a locking hole 12d at its leg portion 12a to which the hook 92a is locked. The above-described airbag 1 cover according to the present invention is used for the airbag cover 1. The inflator 91 may be mounted on the outside of the retainer 92 instead of being housed inside the retainer 92. The retainer 92 is connected to a fixing component 94 via a connecting component 93.

The airbag apparatus is a passenger airbag that is installed on the instrument panel 2 disposed in front of a passenger seat P (see FIG. 1(A)). Accordingly, the top surface of the airbag cover 1 constitutes part of the instrument panel 2. In addition, the above-described airbag cover 1 according to the present invention is used for the airbag cover 1. This results in a reduction in the number of components and a reduction of man-hours as well as ensures the rigidity of the instrument panel 2 despite the use of a soft resin. Furthermore, this allows a seam between the airbag cover 1 and the instrument panel 2 to be disposed so as to be hardly visible to or hidden from occupants in the driver's sear D and the passenger seat P, thereby keeping aesthetically pleasing appearance.

The thinner portion 15a formed in a connecting section between the plate-like portion 11 and the inner case 12 suppresses deformation of the connecting section resulting from contraction associated with curing of a resin, which prevents sink from occurring on the surface of the airbag cover 1, resulting in improvement in the appearance of the airbag cover 1. In addition, a plurality of ribs 15b disposed on the outer surface of the thinner portion 15a of the hinge 15 eliminates the necessity for a thinner portion constituting a hinge 15 to be separately formed in the plate-like portion 11, resulting in a simplified structure of the hinge 15. Furthermore, the ribs 15b formed so as to be bendable and bucklable can absorb an impact created at the time of turning of the door 11a, thereby effectively preventing the door 11a from breaking away.

As described in FIG. 4(B), the TPO material used in the airbag cover according to the present invention has an advantage of light weight. Accordingly, in the leg portion 12a of the inner case 12, a portion where a locking hole 12d is formed can have a larger wall thickness than the plate-like portion 11 or a conventional leg portion, thereby enhancing rigidity. Consequently, an airbag apparatus that is more resistant to impact associated with airbag deployment than conventional airbag apparatuses can be provided. Conventional airbag apparatuses need 10 to 14 locking holes 12d, while the airbag apparatus according to the present invention results in reduction to 8 to 10 locking holes 12d as well as reduction in the number of the metal hooks 92a, leading to cost reduction and weight reduction.

The present invention is not limited to the above embodiment, and can be applied to an airbag cover and an airbag apparatus that have a tear line 11b formed in a U-shape with a single door. Needless to say, a reinforcement rib may be disposed on the inside of the thinner portion 15a. Various modifications are conceivable within the scope of the present invention.

What is claimed is:

1. An airbag cover and an instrument panel combination for a vehicle having a passenger side and a driver side with the instrument panel extending across both the passenger side and the drive side of the vehicle, the combination comprising:
   a plate portion of the airbag cover for extending over a passenger airbag on the vehicle's passenger side;
   depending leg portions extending transverse to the plate portion and formed integrally therewith so that the plate portion and leg portions are of a single piece construction;
   a tear line of the plate portion generally between the leg portions;
   an opening formed in the plate portion upon airbag deployment and rupture of the tear line;
   peripheral portions of the plate portion extending beyond the leg portions and being sized so that the plate portion has a surface area that is several times greater than of the opening formed in the plate portion,
   wherein the plate portion and the leg portions are of an olefin thermoplastic resin which has the following characteristics:
   (a) bending modulus of elasticity 500 to 1000 MPa,
   (b) tensile break strength: 15 to 40 MPa,
   (c) stretch at break: 600% or more, and
   (d) Izod impact strength: not to break away at $-35$ degrees centigrade or more;
   an opening of the instrument panel for mounting of vehicle instruments therein with the opening being on the vehicle's driver side; and
   a convex portion of the instrument panel extending about the opening thereof on the vehicle's driver side,
   wherein the airbag cover is sized to extend from the vehicle's passenger side extending over the passenger airbag to the vehicle's driver side where an outer peripheral edge thereof is mounted to extend around and behind the instrument panel convex portion to minimize visibility of the outer peripheral edge to integrate the instrument panel with the airbag cover.

2. The airbag cover of claim 1, wherein the plate portion surface area is approximately 1000 $cm^2$ to approximately 2000 $cm^2$ and is approximately three to eight times that of the opening in the plate portion.

3. The airbag cover of claim 1 wherein the peripheral portions including an outermost rim edge, and the opening is disposed at least 30mm away from the rim edge of the plate portion.

4. The airbag cover of claim 1, wherein the plate portion has a thickness of 2.5 mm to 3.5 mm, and at least one of the leg portions is partially thicker than the plate portion.

5. The airbag cover of claim 1, wherein the plate portion includes a door that splits open along the tear line upon airbag deployment, and
   a hinge portion between the plate portion and at least one of the leg portions that rotatably holds the door and which has a thin portion thinner than the one leg portion.

6. The airbag cover according to claim 5, wherein the hinge portion has a plurality of ribs disposed on an external surface of the thin portion so as to be bendable and bucklable upon airbag deployment and door rotation.

7. An instrument panel assembly for a vehicle having a passenger side and a driver side, the instrument panel assembly comprising:

an instrument panel having an outer surface including a convex portion and an instrument panel opening in the outer surface for vehicle instrumentation on the vehicle's driver side with the convex portion extending along the opening and the instrument panel outer surface having a predetermined surface area;

an airbag cover on the vehicle's passenger side distinct from the instrument panel and including an outer surface having a predetermined surface area being generally aligned with the instrument panel outer surface and including a frangible plate portion, the predetermined surface area of the instrument panel outer surface being larger than the predetermined surface area of the airbag cover outer surface;

leg portions integrally formed with the plate portion to depend therefrom with the leg portions operable to guide a deploying passenger airbag upwardly therealong to rupture the frangible plate portion; and an outer side portion of the frangible plate portion that extends on the vehicle's driver side adjacent to and along the convex portion of the instrument panel to form an interface between the instrument panel and the airbag cover that is minimally visible or hidden to an occupant of the vehicle, wherein the plate portion and the leg portions are of an olefin thermoplastic resin which has the following characteristics:

(a) bending modulus of elasticity: 500 to 1000 MPa,
(b) tensile break strength: 15 to 40 MPa,
(c) stretch at break: 600% or more, and
(d) Izod impact strength: not to break away at −35 degrees centigrade or more, and wherein the instrument panel convex portion has a backside adjacent a windshield of the vehicle, and the outer side portion of the airbag cover plate portion extends on the vehicle's driver side along the backside of the instrument panel convex portion.

8. The instrument panel assembly of claim 7 wherein the instrument panel convex portion and the outer side portion of the airbag cover plate portion have matching configurations at the interface therebetween.

9. The instrument panel assembly of claim 7 wherein the frangible plate portion has a door that splits open upon airbag deployment to form a door opening in the frangible plate portion for the deploying airbag, and the plate portion including the outer side portion thereof is sized to have a surface area that is several times larger than that of the door opening.

10. The instrumental panel assembly of claim 9, wherein the door is formed by a tear line in the plate portion so as to split open, and the tear line is formed by any one of machining, laser beam machining, and ultrasonic machining which follows forming of the airbag cover.

11. The instrument panel assembly of the claim 9 wherein the surface area of the plate portion is between approximately 1000 cm$^2$ and approximately 2000 cm$^2$ and the surface area of the door opening is between approximately 250 cm$^2$ and approximately 300 cm$^2$.

\* \* \* \* \*